May 21, 1957  A. W. GAUBATZ  2,793,023

CENTRIFUGAL GOVERNOR

Filed Dec. 17, 1952

INVENTOR
Arthur W. Gaubatz
BY
Willits, Helmig & Baillio
ATTORNEYS

United States Patent Office 2,793,023
Patented May 21, 1957

2,793,023

CENTRIFUGAL GOVERNOR

Arthur W. Gaubatz, Indianapolis, Ind., assignor to General Motors Corporation, Detroit, Mich., a corporation of Delaware Application December 17, 1952, Serial No. 326,568

6 Claims. (Cl. 264—3)

This invention relates to centrifugal governors and, more particularly, to centrifugal governors in which a number of electrical switches or other control elements are actuated sequentially at predetermined speeds of rotation of an engine or other rotating agency.

The invention has among its objects to provide an improved centrifugal governor in which a plurality of control elements are sequentially actuated and which is of minimum overall dimensions, which is operative over a wide range of rotational speeds and which is possessed of a high degree of sensitivity and stability.

The invention employs a basic governor construction in which a plurality of centrifugally-actuated flyweights are revolved by a rotating shaft and transmit an axial thrust to adjust the axial position of a slidable sleeve member. According to one feature of the invention, the sleeve member is centered relative to and supported in spaced relation from the rotating shaft in such manner as to prevent radial movement of the sleeve and to assure proper alignment thereof under all operating conditions. The sleeve is supported from the rotating shaft through a thrust anti-friction bearing the inner race of which is mounted on the sleeve and the outer race of which is supported from and revolved by the rotating shaft. The sleeve will have a slight rotational tendency about the shaft but is supported against substantial rotation therefrom.

Another feature of the invention is a self-adjusting stop mechanism which prevents any rotational tendency of the sleeve member, by reason of the mounting thereof, at fixed speeds of the rotating shaft but which permits limited arcuate motion of the sleeve during its axial travel so as to allow free and positive action thereof without binding that otherwise would occur were the sleeve totally restrained against rotary motion.

To avoid the unpredictable effects of rotating balance springs, commonly used in prior art governor structures, the invention features the use of non-rotating balance springs for resisting the movement of the slidable sleeve and, hence, of the centrifugally-actuated flyweights. Two different balance springs mounted against rotation are employed and are so arranged that one of the springs will be effective to resist movement of the sleeve and weights at low speeds for a predetermined amount of sleeve travel, while both springs will be effective at high speeds after the sleeve has exceeded said predetermined amount of travel. The governor, therefore, is adapted in the above and other respects for positive and reliable operation over a wide range of rotational speeds with a minimum amount of sleeve travel without impairing the sensitivity or increasing the overall dimensions thereof.

The above and other objects, features and advantages attending the present invention will appear more fully from the following detailed description of the drawings, wherein Fig. 1 is a longitudinal elevation view, taken in section and with parts broken away, of a governor in accordance with the present invention;

Figure 1:
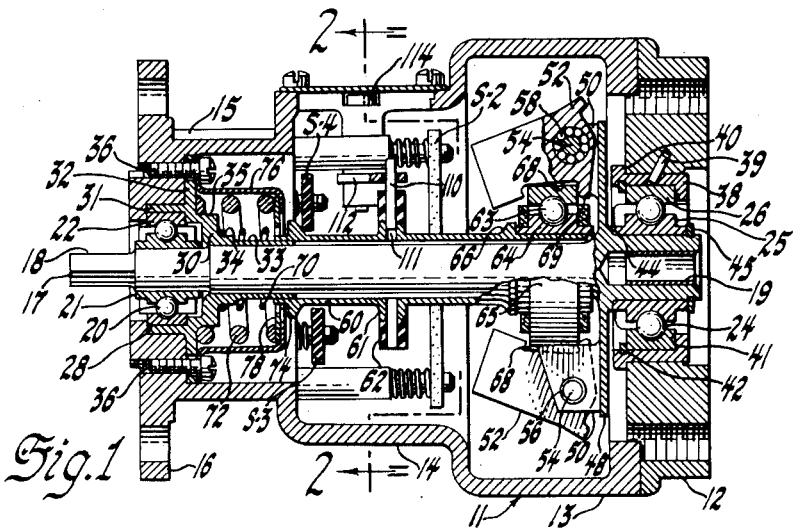

Referring to the drawings, the governor assembly shown in Fig. 1 is contained in a generally two-piece housing comprising a walled hollow body portion 11 and a centrally apertured end cover 12 adapted to be detachably secured to one end of the body portion 11. The body portion is a one-piece casting composed of several different integral sections along the length thereof comprising an end portion 13 of substantially circular section, a reduced central portion 14 of substantially square section and a further reduced end portion 15 of substantially square section, the latter having a centrally apertured mounting flange 16 integrally formed thereon by which the governor housing may be mounted on an engine or other rotary device.

The governor shaft 17, which may be driven either from its squared end 18 or counterbored end 19, is mounted for rotation within the housing and is centrally supported therein by a pair of spaced shaft bearings 20 and 24 which are contained in the flanged end 16 of the body 11 and in the end cover 12, respectively, of the governor housing. The inner face of the mounting flange 16 is counterbored so as to form an abutment or shoulder 28 that prevents outward axial movement of the shaft bearing 20, the inner race 21 of which is tightly fitted on a reduced portion near the squared end of the governor shaft. The outer race 22 of the shaft bearing 20 is received in one end of a radially-stepped bushing 30 and within an axially extending annular flange 31, which is integrally formed on the latter and seats in the counterbored face of the housing end mounting flange 16. The bushing 30 has an outwardly extending flanged portion 32 between the annular flange 31 and the radially stepped portions 33, 34 and 35 thereof and is detachably secured to the inner face of the mounting flange by cap screws, as 36, extending through the flange 32, as shown.

The outer race 26 of the bearing 24 at the opposite or counterbored end of the governor shaft is received in an axially aligned collar 38 which is centrally located in the apertured end cover 12 and is secured therein by a pin 39. The collar 38 is formed with an outwardly extending flange 40, which locates the collar against the inner surface of the end cover 12, and with an inwardly depending flange 41 that retains one end of the outer race 26 of the bearing, the other end of the outer race being retained in the collar by a snap ring 42. The inner race 25 of the bearing 24 abuts against a shoulder 44 integrally formed near the counterbored end of the shaft and is retained on the shaft by a snap ring 45.

A radially projecting flange or disk 48 integrally formed on the rotating governor shaft 17 adjacent the shoulder 44 thereon carries a number of spaced sets of arms 50, which may be shaped generally as shown and form clevis-like mounting brackets for the governor flyweights 52 surrounding the shaft. Each bracket is formed by a pair of adjacent arms and, preferably, three brackets or sets of arms are employed, one arm of only two of the brackets being shown in Fig. 1. Each of the flyweights is pivotally mounted between a pair of adjacent arms on a pin 54 which extends transversely through both the weight and the bracket arms and is suitably retained on the arms as by small snap rings, one of which is shown at 56. Roller bearings 58 are provided between the flyweight pin 54 and the flyweights to reduce rolling friction therebetween. The governor weights may be mounted on two rows of ball bearings with a spacer sleeve of porous bronze saturated with a lubricant between the rows of balls.

Spaced from the rotating input shaft 17 and coaxial therewith is an axially shiftable element in the form of a slidable sleeve member 60 that has a camming surface in the form of an annular flange 61 integrally formed intermediate the ends thereof. The flange 61 is externally threaded to receive an internally threaded insulating collar 62, the function of which will be described hereinafter. One end of the sleeve 60 is supported from and is in light frictional engagement with the innermost stepped portion 33 of the fixed sleeve 30. The other end of the sleeve has an anti-friction bearing 63 mounted thereon, the inner race 64 of which is pressed on the sleeve and bears against a shoulder 66 integrally formed on the latter. The outer race 65 of the sleeve bearing is supported radially from the flyweight mounting arms 50 which form a fingered pocket therefor, thereby centering the slidable sleeve radially and avoiding shuffling of the sleeve bearing. The bearing pocket formed by the arms 50 is axially bored so that the radial inwardly extending edge of each arm will be of arcuate section to conform to the circular forms of the outer race of the sleeve bearing. The inner edges of the support arms extend parallel to the axis of the sleeve so as to permit axial movement of the bearing and sleeve relative to the shaft 17. The bracket arms are thus made to serve the plural functions of providing a mounting for the governor flyweights and of centering and supporting the slidable sleeve from the rotating shaft through the sleeve bearing. Since the sleeve is supported from the rotating shaft by the bearing 63 the outer race of which revolves with the shaft, the sleeve will have a slight rotational tendency, as will be described more fully hereinafter.

The inner edge of each of the governor flyweights is notched or grooved as shown at 68 so as to fit loosely over the outer race 65 of the sleeve bearing and has an inwardly projecting tang 69 thereon forming one side of the notch and bearing against the adjacent side of the outer race to exert an axial thrust to move the bearing and sleeve as the rotating flyweights swing outwardly under the influence of centrifugal force. The notch 68 provides a surface which contacts the bearing and limits the inward motion of the flyweights.

Movement of the sleeve and, hence, of the flyweights under the influence of centrifugal force, is yieldably opposed by suitable resilient non-rotating balance means such as a pair of compressed coil springs 70 and 72. Balance spring 70 is a light low-rate inner spring, which is effective in a low-speed operating range of the governor, and has one end thereof seated on the intermediate stepped portion 34 of the bushing 30 and its other end seating against a shoulder 74 integrally formed near the end of the slidable sleeve 60 adjacent the spring. The outer balance spring 72 is a high rate spring which is effective in a high speed range of operation of the governor, and has one end thereof seated on the outermost stepped portion 35 of the bushing 30, substantially as shown. The outer spring 72 is preloaded by a cage 76, which surrounds the balance springs and contains an apertured disk or thrust washer 78 adjacent the other end of the outer spring 72. The slidable sleeve 60 passes centrally through the apertured washer 78 and after a predetermined amount of longitudinal movement, the shoulder 74 on the sleeve engages the washer 78 at which time the outer spring will be effective to influence the movement of the slidable sleeve.

The opposing action of the outer spring 72 on the movement of the slidable sleeve 60 and the governor weight 52 is effectively delayed by reason of the caged mounting thereof, which construction, together with the axially displaceable thrust washer 78, cooperates with the sleeve shoulder 74 to provide a unique mechanical spring pick-up responsive to the position of the sleeve and, hence, the speed of the input shaft. It will be noted also that both of the balance springs are stationary so as to promote smooth and reliable action thereof, thereby avoiding erratic and unpredictable spring action that otherwise would be encountered with rotating springs.

Mounted within and supported from the interior of the body portion 11 of the governor housing are a plurality of control elements such as electrical micro-switches S–1, S–2, S–3 and S–4 (Fig. 2), the mounting bases of only three of the switches being shown in Fig. 1. The switches are axially displaced alongside the slidable sleeve 60 and are adapted to be actuated in succession by the sleeve collar 62.

In the illustrated embodiment of the invention, four switches or control elements are employed, although it is apparent that the invention can be adapted readily to accommodate a greater or lesser number of electrical switches or other control elements. Switches S–1 and S–2 are mounted on the weight side of the sleeve collar 62 and are low-speed switches adapted to be actuated at speeds of, say, around 530 and 1730 R. P. M., respectively, of the input shaft 17. Switches S–3 and S–4, which are shown in Fig. 1 mounted on the other side of the sleeve collar 62 and disposed at right angles to switches S–1 and S–2, are high speed switches operative at, say, 2040 and 2450 R. P. M., respectively, of the input shaft.

Figure 5:
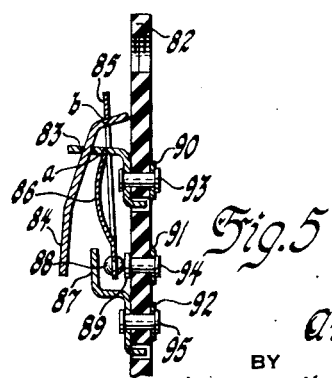
Fig. 5 is a longitudinal sectional view of an electrical switch suitable for use with the governor of the present invention.

The micro-switches are of the conventional snap action, over-center variety, having a limited amount of switch travel. As best shown in Fig. 5, each switch comprises an insulating mounting base 82, an upturned bracket arm 83, a movable actuator arm 84 that passes through an opening in the upper end of the bracket arm 83, a contact arm 85 which straddles the bracket arm 84 and is in engagement with and supported at one end from the actuator arm 84, an integrally formed leaf spring 86 on the contact arm, a stepped bracket arm 87 which forms a stop for a contact 88 on one end of the contact arm 85, and a stationary button 89 presenting a contact head for the contact 88. The end of the leaf spring 86 adjacent the upturned bracket arm 83 is in engagement therewith at a point $a$ which is so disposed relative to a point $b$ at which the actuator arm 84 engages the contact arm that a slight displacement of the contact arm by the actuator arm above the said end of the integral leaf spring flexes the spring in the opposite direction shown and deflects the contact arm from the stationary contact button 89 so that the contact 88 of the contact arm engages the stepped bracket arm 87. Each switch is equipped with three terminal lugs 90, 91, 92 which are electrically connected to the upturned bracket arm 83, the contact button 89 and the stepped bracket arm 87 by conducting rivets or studs 93, 94, 95, the ends of which are upset to secure the switch elements rigidly to the mounting base 82.

Figure 2:
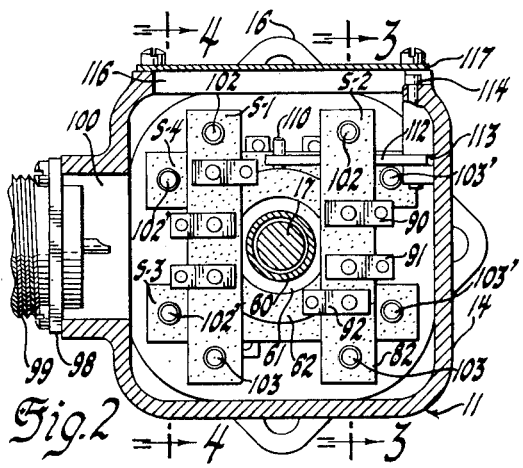
Fig. 2 is a transverse sectional view taken substantially in the plane 2—2 of Fig. 1.
Figure 3:
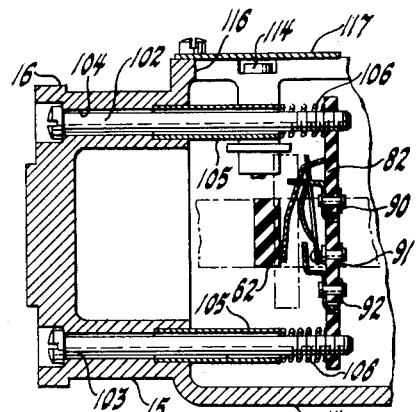
Fig. 3 is a fragmentary longitudinal sectional view taken in the plane 3—3 of Fig. 2.
Figure 4:
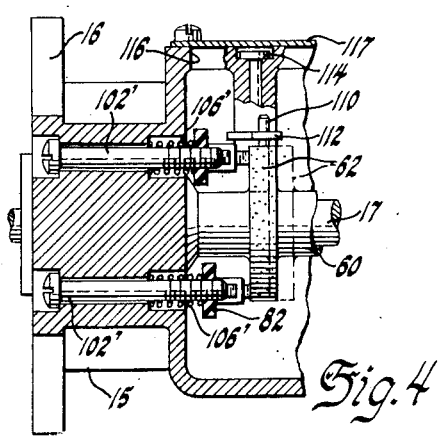
Fig. 4 is a fragmentary longitudinal sectional view with parts broken away and taken in the plane 4—4 of Fig. 2.

By connecting a separate pair of electrical conductors (not shown) to the terminal lugs 90 and 91 or 90 and 92 of respective ones of the switches, the switches may be arranged to complete separate electrical circuits therethrough where the sleeve collar 62 either recedes from a low-speed switch, as in Fig. 3, or approaches a high-speed switch, as in Fig. 4. A cover plate 98 mounting a multi-terminal cable connector 99 is detachably mounted over an opening 100 formed in one side of the square central portion 14 of the governor housing body 11, as shown in Fig. 2, whereby to facilitate making of external and internal electrical wiring connections to the switches.

The manner in which the low and high-speed switches are mounted within the governor housing is illustrated in Figs. 3 and 4, respectively, each low-speed switch being mounted from its base 82 by a pair of spaced bolts 102 and 103, which are inserted from the flanged end 16 and extend through openings, as 104, in the end portion 15 of the governor body 11 into the central portion 14 thereof. The bolts are threadedly received in threaded openings provided in the opposite ends of each of the switch bases and permit axial adjustment of the switch position so as to set the switch for operation at a predetermined speed.

Surrounding a substantial portion of each of the bolts 102, 103 of the low-speed switches is a sleeve 105, one end of which is seated in the counter-bored inner end of the opening 104, and a tensioning spring 106 between the other end of the sleeve 105 and the switch mounting base 82, as shown. The high-speed switches are mounted in substantially similar manner except that the mounting bolts 102', 103' thereof are of lesser length and the bolt sleeves used for mounting the low-speed switches are omitted therefrom. As may be readily ascertained from Fig. 4, the tensioning springs 106', serve to take the axial thrust of the slidable sleeve 60 as the sleeve collar 62 thereon engages the actuator arms of micro-switches. The switch springs are preloaded heavier than the pressure required to operate the switch. This holds the switch firmly in position without straining the switch base.

By reason of the high and low-rate balance springs employed, the governor is adapted for multi-stage operation and will have a step effect so as to accommodate an operating position for four switches through a wide range of speed with a limited amount of switch and sleeve travel. By careful selection of the spring rates of the balance springs, substantially the maximum centrifugal moment of the governor weights may be assured for each stage or range of operation of the slidable sleeve, thereby assuring maximum efficiency of the governor. For example, the inner spring 70 may have a spring rate of, say, about 10 lbs./in. while the outer spring 72 may have a spring rate of about 350 lbs./in. The tensioning springs 106, 106' on the switch mounting bolts may have a spring rate of about 17.5 lbs./in.

Inasmuch as the outer race 65 of the sleeve bearing 63 rotates with the weight mounting arms 50 carried by the flange 48 of the rotating input shaft 17, frictional forces will be transmitted through the sleeve bearing so as to exert a torque on the slidable sleeve and tend to rotate the latter slowly. As a result, the sleeve will tend to rotate slowly and may change its axial position so as to seriously affect the accuracy of the governor. The frictional drag of the bearing presents a serious problem, particularly when starting the governor from rest, inasmuch as the bearing lubricant may be in a somewhat congealed condition, whereby a considerable amount of torque may be transmitted through the sleeve bearing. In solution of this problem, the invention provides a stop mechanism which prevents the frictional torque transmitted through the sleeve bearing from rotating the slidable sleeve at fixed speeds of the input shaft. Since the resultant of the frictional forces transmitted through the sleeve bearing and the axial thrust exerted thereon by the governor weights tends to impart a slight helical movement to the slidable sleeve 60, the stop mechanism is provided with a self-adjusting feature which permits a slight amount of arcuate motion of the sleeve during its axial displacement so as to permit free and substantially frictionless movement without binding of parts what would otherwise occur were arcuate motion of the sleeve completely prevented.

The stop mechanism by which the above function is accomplished comprises a pin 110 which is pressed into a radial opening 111 in the sleeve collar 62, a torque arm comprising a link 112 one end of which is pressed on the outer portion of the pin 110 and its other end located in a slot 113 (Fig. 2) formed within the central portion 14 of the body casting 11 and retained therein by a capped pin 114 about which the link may be pivoted. The torque arm 112 thus serves as a stop for the sleeve collar 62 and swings through a small arc centered about the pin 114 and permits limited arcuate motion of the slidable sleeve to accommodate the helical movement thereof.

The central portion 14 of the governor housing body 11 has an opening 116 in another one of the sides thereof with a detachable cover 117 so as to permit assembly of the torque arm mechanism and to permit access to the torque arm mechanism and the electrical switches and other parts of the governor apparatus, substantially as shown.

What is claimed is:

1. A centrifugal governor comprising, in combination, a housing, a rotating shaft, a plurality of flyweights revolved by said shaft, a sleeve surrounding said shaft and axially movable thereof by said flyweights in accordance with the rotational speed of said shaft, a pair of axially yieldable resilient means mounted against rotation relative to said housing and operatively associated with said sleeve to resist movement thereof, one of said resilient means being operative to resist movement of said sleeve in a low speed range of operation of said governor and both of said resilient means being operative in a high speed operating range of said governor, and a plurality of control means axially displaced alongside said sleeve and responsive to the said axial movement thereof for sequential actuation thereby.

2. A centrifugal governor comprising, in combination, a housing a rotating shaft, a plurality of flyweights revolved by said shaft, a sleeve surrounding said shaft and axially movable thereof by said flyweights in accordance with the rotational speed of said shaft, a plurality of compressed coil springs coaxially disposed about said shaft, said coil springs being mounted against rotation relative to said housing and being operatively associated with said sleeve for opposing axial movement thereof by said flyweights, means delaying the influence of one of said springs on the displacement of said sleeve over a predetermined range of sleeve movement and a plurality of control means axially displaced alongside said sleeve and responsive to the said axial movement thereof for actuation thereby.

3. A centrifugal governor comprising, in combination, a housing, a rotating shaft, a plurality of flyweights revolved by said shaft, a sleeve surrounding said shaft and axially moveable thereof by said flyweights in accordance with the rotational speed of said shaft, a pair of compressed coil springs mounted against rotation relative to said housing and operatively associated with said sleeve for opposing axial movement thereof by said flyweights, a plurality of control means axially displaced alongside said sleeve and responsive to the axial movement thereof for actuation thereby, one of said springs being in continuous engaged relation with said sleeve for resisting movement thereof in a low speed range of operation of said governor, and spring pick-up means actuated by the movement of said sleeve, said spring pick-up means engaging the other of said springs with said sleeve in a high speed range of operation of said governor.

4. A centrifugal governor comprising, in combination, a housing having an end wall and including a rotating shaft having an end extending through the wall of said housing, a plurality of flyweights revolved by said shaft, a sleeve surrounding said shaft and axially moveable thereof by said flyweights in accordance with the rotational speed of said shaft, a pair of compressed coil springs mounted against rotation relative to said housing and operatively associated with said sleeve for opposing axial movement thereof by said flyweights, spring pick-up means delaying the influence of one of said springs on the movement of said sleeve over a predetermined range of sleeve movement and a plurality of control means axially displaced alongside said sleeve and responsive to the axial movement thereof for actuation thereby, said spring pick-up means comprising a cage mounted on said wall of said housing and enclosing one of said springs, an axially displaceable apertured element between the displaceable end of said one spring and the end of said cage, and engaging means carried on said sleeve near one end thereof engaging said displaceable element after a predetermined amount of movement of said sleeve.

5. A centrifugal governor comprising, in combination, a housing, a shaft mounted for rotation within said housing, a plurality of centrifugally-actuated flyweights revolved by said shaft, means supporting said flyweights from said shaft, a bushing in said housing near one end of said shaft, a sleeve having one end thereof supported from and in light frictional engagement with said bushing, ball bearing means supporting the other end of said sleeve from said rotating shaft, said bearing means having an inner race rigidly mounted on said slidable sleeve and a rotatable outer race supported radially between said flyweight supporting means, said flyweights operatively engaging the said outer race of said bearing to displace said sleeve axially of said shaft in accordance with the rotational speed thereof, stop-means within said housing limiting arcuate motion of said sleeve resulting from any frictional drag transmitted through said sleeve bearing, flyweight balance spring means mounted against rotation within said housing and operatively associated with said slidable sleeve for resisting axial displacement thereof, and control means mounted within said housing and actuated by said sleeve at predetermined speeds of rotation of said shaft.

6. In a multi-stage centrifugal governor, the combination of a housing having an end wall, a shaft rotatable in said housing and having an end extending through the said wall thereof, a plurality of flyweights revolved by said shaft, an operating member shiftable axially of said shaft by said flyweights, a plurality of concentric coil springs coaxial to said shaft for resisting axial movement of said operating member and including a first and second coil spring each having one end mounted on said housing wall, the other end of the first of said springs being in continuous engagement with said operating member, and a centrally apertured cage coaxial with said shaft and mounted on the said wall of said housing, said cage enclosing said second spring and including a displaceable thrust washer therein engaging the other end of said second spring, and means on said operating member adapted to engage said thrust washer and compress said second coil spring in a predetermined range of movement of said operating member.

References Cited in the file of this patent

UNITED STATES PATENTS

| | | |
|---|---|---|
| 2,204,639 | Woodward | June 18, 1940 |
| 2,220,996 | Feigel | Nov. 12, 1940 |
| 2,256,715 | Kirschner | Sept. 23, 1941 |
| 2,631,025 | Bone | Mar. 10, 1953 |